April 30, 1963   F. PAPKE   3,087,376
PHOTOGRAPHIC FINDER WITH IMAGING OF THE INDICATOR
POSITION OF THE EXPOSURE METER
Filed Oct. 31, 1961   2 Sheets-Sheet 1

INVENTOR
FRIEDRICH PAPKE
By Blum, Moscovitz, Friedman
and Blum
ATTORNEYS

April 30, 1963

F. PAPKE 3,087,376

PHOTOGRAPHIC FINDER WITH IMAGING OF THE INDICATOR
POSITION OF THE EXPOSURE METER

Filed Oct. 31, 1961

INVENTOR
FRIEDRICH PAPKE
By Blum, Moscovitz, Friedman and Blum
Attorneys 3,087,376
PHOTOGRAPHIC FINDER WITH IMAGING OF THE INDICATOR POSITION OF THE EXPOSURE METER
Friedrich Papke, Braunschweig, Germany, assignor to Voigtlander A.G., Braunschweig, Germany, a corporation of Germany
Filed Oct. 31, 1961, Ser. No. 148,977
Claims priority, application Germany Nov. 2, 1960
4 Claims. (Cl. 88—1.5)

This invention relates to Albada type viewfinders and, more particularly, to finders of this type constructed and arranged to provide, in the field of view of one looking through the viewfinder, an image of the position on an indicator, scale or the like, located extraneous to the viewfinder.

Finders designed to provide an image of the position of an extraneous exposure meter indicator, re-set indicator, or the like, in their field of view and in addition to the camera objective, are known. In many cases, the image of the indicating element or the like is provided by reflection of the imaging light rays by plane mirrors positioned adjacent the edge of the cone of light rays entering the finded from the camera objective. For example, such plane mirrors may be mounted completely outside the viewfinder or in engagement therewith to only a slight degree. The mounting of the mirrors can be effected in various ways.

Recently there has been provided a viewfinder of this type wherein the mirror for reflecting the light rays imaging the extraneously located indicator or the like is cemented into a slot in the viewfinder body, such as in a slot in a block type Albada viewfinder. The cement used has the same refractive index as that of the material of the block in which the mirror is mounted, and thereby the surfaces of the slot need be finished only roughly. Despite this, and due to the use of the cement having an index of refraction substantially equivalent to that of the material in which the slot is cut, a clear view is provided as far as the mirror and, if the latter is partially light-permeable, beyond the mirror.

In this latter design of a viewfinder, the mirror has been positioned in the path of the light rays imaging the indicator or the like between the eye piece and a collimator lens so designed and constructed that an observer, looking through the viewfinder, sees the image of the indicator or the like focused at substantially infinity, and thus appearing in the same field of view as the image of the objective.

However, this disposition of the oblique reflecting mirror in a slot entails considerable production difficulties. Not only is it difficult to form the slot precisely with respect to its angular relation to the optical axis of the viewfinder, but also, and even where extreme precision is exercised in forming the slot, the securement of the mirror therein by the cement presents difficulties. This mirror must be thinner than the width of the slot, and thus misalignment of the mirror is likely to occur readily while the latter is being cemented in position. Consequently, it frequently happens that the mirror is not precisely positioned in the desired and necessary relation to the eye-piece and the collimator lens.

The present invention is directed to a viewfinder of this design in which provision is made for compensating for any possible misalignment of the deflecting mirror. More particularly, a cylindrical cementing interface is provided between the transparent body, having the mirror mounted in a slot therein, and the collimator lens which is disposed between the mirror and the indicator or the like whose image is to be provided in the viewfinder. This cementing interface is so designed and dimensioned that an angular adjustment of the collimator lens can be effected when the latter is being united to the transparent body supporting the oblique mirror. Such angular adjustment of the collimator lens, which is effected during cementing thereof to form a unitary construction with the transparent body mounting the oblique mirror, makes it possible to deflect the light rays reaching the mirror in such a manner as to compensate for any angular misalignment of the oblique mirror which may have occurred during cementing of the latter into its slot. Where a cylindrical cementing interface is used, the collimator lens is angularly adjusted about the axis of the cylindrical interface. In some cases, a spherical cementing interface may be used in place of a cylindrical cementing interface.

In the following description of typical examples of the invention, and in the drawings illustrating the same, a block type of Albada finder has been shown by way of a preferred design. As is known, in an Albada viewfinder, an image limiting frame is arranged to be focused at a substantially infinity by means of a partially light-permeable mirror which is concave in the direction of the observer's eye. This block type Albada viewfinder has also been illustrated as formed with a known type of arrangement for providing an image of the exposure meter indicator, or the like, in the field of view of the viewfinder, but merely by way of example.

However, it should be understood that, despite the particular examples shown and described, the structural design of the viewfinder, as such, forms no part of the present invention, and that the transparent components thereof may be made of glass or of other transparent material, such as a transparent plastic.

For an understanding of the principles of the invention, reference is made to the following description of typical embodiments thereof as illustrated in the accompanying drawings. In the drawings.

Figure 1:
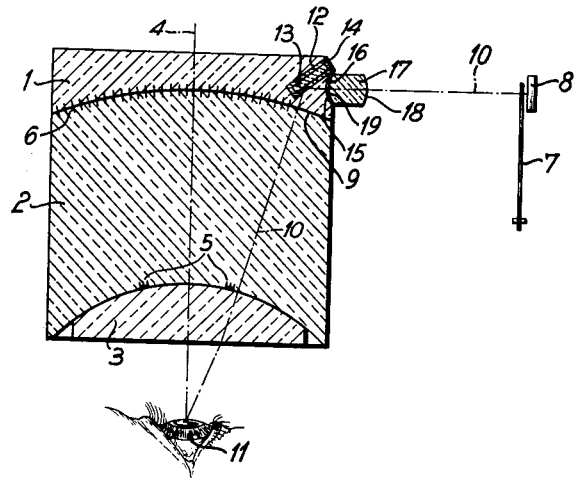
FIG. 1 is a somewhat schematic axial sectional view of a block type Albada viewfinder embodying the invention and in which the oblique mirror is mounted in a slot in the front lens of the viewfinder.

Referring to FIG. 1, the block type Albada viewfinder shown therein includes a front lens 1, an intermediate block of transparent material 2, and a rear or ocular member 3, these three parts being cemented to each other using transparent optical cement. The optical axis of the viewfinder is indicated at 4. The image limiting frame 5 is positioned at the interface between the intermediate block 2 and the rear or ocular member 3, and in substantially the focal plane of the partially light-permeable mirror 6 for focusing of the frame 5 by the mirror 6 at substantially infinity. The partially light-permeable mirror 6 is positioned in the interface between the front lens 1, and the intermediate block 2.

The viewfinder is also arranged to provide an image, at substantially infinity, of an exposure meter indicator or the like 7 movable relative to a scale 8, elements 7 and 8 being located laterally extraneous of the viewfinder. The mirror 6 is omitted from the portion 9 of the interface between the front lens 1 and the intermediate block 2, to provide for substantially unobstructed passage of the light rays 10, imaging the elements 7 and 8, to the eye 11 of an observer looking through the viewfinder. In this particular embodiment of the invention, a lateral surface of the front lens 1 is formed with an oblique slot 12 in which a mirror 13 is cemented by means of transparent optical cement 14. Mirror 13 reflects the light rays 10 to the eye 11. The cement 14 has the same refractive index as that of the material of the front lens 1.

In accordance with the invention, the lateral surface of front member 1 formed with the slot or pocket 12 is also formed with a groove 15 which, by way of example, is shown as cylindrical. This groove 15 receives a layer of transparent optical cement 16 for cementing collimator lens 17 to the viewfinder, cement 16 having a refractive index substantially equal to that of the material of the front lens 1. The spherically convex outer face 18 of the collimator lens 17 faces indicator 7 and scale 8 and is arranged to focus the image of these elements at substantially infinity with respect to the eye of an observer looking through the viewfinder, and thus to provide such image in the same field of view wherein is located the finder image or objective image. Lens 17 has a cylindrical surface 19 which is substantially concentric with the cylindrical groove 15.

In the manufacture of the viewfinder shown in FIG. 1, the first step is the cementing of the mirror 13 into the front lens 1. After this, the components 1, 2 and 3 are cemented together utilizing a transparent optical element. Next, the viewfinder is associated with a test arrangement arranged to provide an image corresponding to the image of the indicator 7 and the scale 8 which would be provided after assembly of the viewfinder into a camera. The lens 17 is then positioned in the cylindrical groove 15 and adjusted about the axis of this groove until the image of the test arrangement falls in the predetermined position. The finder has now been adjusted as a whole and, after the cement securing the collimator lens 17 to the front member 1 has set, the entire finder can be mounted in the camera and properly aligned therein.

Due to the adjustment of the collimator lens 17 in association with the test device, the light rays 10 will reach the eye of the viewer in the correct position and without any resetting of lens 17 or mirror 13. This procedure makes it possible to allow considerable variation in the tolerances utilized during production with respect to the individual components of the finder, thereby decreasing the production costs without sacrificing precision of the apparatus as a whole.

Figure 2:
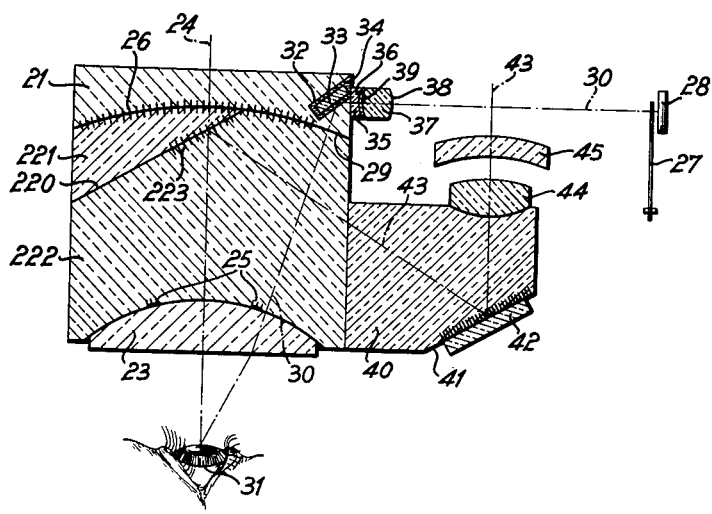
FIG. 2 is a view similar to FIG. 1, but illustrating the viewfinder as constructed as a range or measuring finder and further illustrating an intermediate lens between the collimator lens and the front lens of the viewfinder.

In the embodiment of the invention shown in FIG. 2, the principles of the invention are illustrated as applied to a block type Albada viewfinder embodying a range finder. In this arrangement, the intermediate transparent member is comprised of two components, 221 and 222, united along an interface 220 oblique to the optical axis 24. The partially light-permeable mirror 26 is disposed at the interface between the intermediate transparent block means and the front lens 21, and the picture limiting or defining frame 25 is disposed at the interface between the intermediate block means 222 and the rear or ocular member 23. Frame 25 is in substantially the focal plane of mirror 26 so that it is imaged by the latter at substantially infinity. The ray divider, or partially permeable reflecting oblique mirror 223 occupies a portion of the interface 220 and, as in FIG. 1, the mirror 26 is omitted over a portion of the interface between the front lens and the intermediate block means, as indicated at 29. This allows the light ray 30, as reflected by the oblique mirror 33 mounted in a slot 32 in lens 21 by means of cement 34, to pass unobstructed through the viewfinder. These light rays reach the mirror 33 from the indicator 27 movable relative to the scale 28, and enter through the collimator lens 37, which focuses the rays at substantially infinity as viewed by the eye 31 of an observer so that the image of the elements 27 and 28 appears in the field of view of the objective seen through the viewfinder.

The arrangement and mounting of the collimator lens 33 differs somewhat from that of FIG. 1. In FIG. 2, an intermediate lens 35 is mounted on and preferably cemented to the lateral surface of the front lens 21 and has a cylindrically or spherically concave outer surface 36. The collimator lens 37 has a corresponding cylindrically or spherically convex surface 39 which is cemented to the surface 36. The outer surface of the collimator lens, which faces the indicator 27 and the scale 28, is convex toward these latter elements, as indicated at 38.

The arrangement of FIG. 2 has the advantage, with respect to the arrangement of FIG. 1, that the intermediate lens 35 and the collimator lens 37 can be individually produced by any conventional means, such as, for example, extrusion or pressing. Uniting these two parts by a suitable transparent optical cement, having a refractive index corresponding to that of the two lenses, makes possible the joining of the two lenses even though their adjacent surfaces are not smoothly finished. Also, the operation required, in the embodiment of FIG. 1, to produce the groove 15 on the lateral face of the lens 1 is obviated.

For the purpose of adapting the viewfinder as a range finder, a transparent block 40 is cemented to extend laterally from the intermediate block means 222 and serves as a base for the range finder. This block 40 has an oblique surface 41 on which is mounted the mirror 42 for directing the range finding or measuring ray 43 to the ray divider 223. This ray enters through a lens 44 in advance of which is an adjustable lens 45, the lenses 44 and 45 constituting an Abat wedge for range finding adjustment. It will be appreciated that, while the specific arrangement of the collimator lens 37 is illustrated as incorporated in a range finding type of Albada viewfinder, it may be used in other types of viewfinders and other types of Albada viewfinders.

Figure 3:
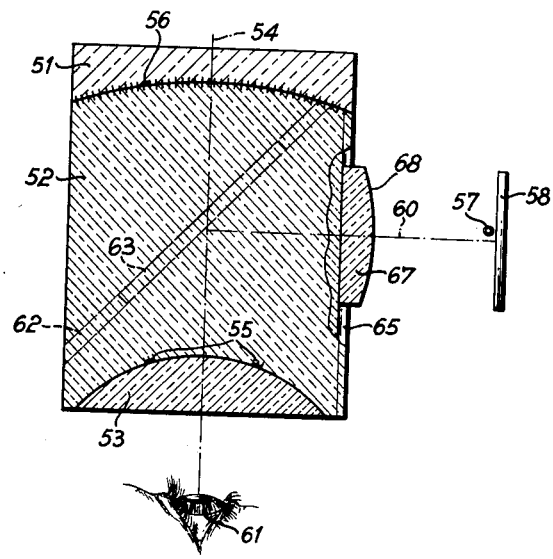
FIG. 3 is a view similar to FIG. 1, but illustrating the oblique mirror as mounted in the intermediate block of the viewfinder.
Figure 4:
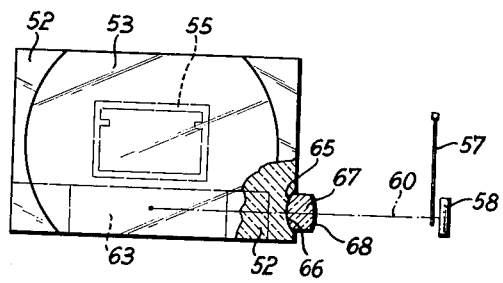
FIG. 4 is an eye end view, partly in section, of the viewfinder shown in FIG. 3.

In the embodiment of the invention shown in FIGS. 3 and 4, the oblique mirror 63 for reflecting the light rays forming the image of the indicator 57 and the scale 58 to the eye 61 is mounted in the intermediate transparent block 52 of the finder. The collimator lens 67 having a cylindrical inner surface 66 is mounted laterally on this intermediate block 52. The front lens 51 and the ocular 53 are again connected by intermediate transparent block 52, with the semi-permeable concave mirror 56 being disposed at the interface between front lens 51 and intermediate block 52. The image limiting or defining frame 55 is disposed in the interface between intermediate block 52 and ocular 53, and is in substantially the focal plane of mirror 56 so that its image is focused thereby substantially at infinity.

The intermediate body or block 52 is formed with a slot 62 which is oblique to the optical axis 54 of the viewfinder and the mirror 63 is cemented in this block with the same attendant possibilty of misalignment as described in connection with the embodiments of the invention shown in FIGS. 1 and 2.

The collimator lens 67 has a spherical convex surface 68 facing toward the indicator 57 and the scale 68, whereby the light rays for imaging the indicator and the scale are focused at substantially infinity as viewed by eye 61. The inner cylindrical face 66 of lens 67 is cemented, with the aid of a transparent optical cement, in a cylindrical groove 65 formed in one lateral surface of intermediate member 52 and, in the example shown, extending throughout the length of this member. The collimator lens 67 is again angularly adjusted, with the use of a test device, until the image of the test device appears at the proper location where the image of the indicator 57 and scale 58 is intended to appear in the completed viewfinder. While not essential, the slot 62 may extend completely across the intermediate block or body 52. It will be noted that lens 67, in addition to being adjustable angularly, is further adjustable longitudinally of groove 65.

While specific embodiments of the invention have been shown and described in detail to illustrate the application of the principles of the invention, it will be understood that these principles may be embodied otherwise without departing from these principles.

What is claimed is:

1. A block type Albada viewfinder arranged to provide, in the field of view of an observer looking through the viewfinder toward the scene to be photographed, an image of the position of indicating means or the like positioned extraneously of the viewfinder, said viewfinder comprising, in combination, a front optical element having a concave inner surface; a rear optical element having a convex surface facing said concave surface; intermediate block means of transparent material having curved end surfaces substantially conforming and cemented to said concave surface and said convex surface; a partially light-permeable mirror arranged in the interface between said concave surface and the adjacent end surface of said intermediate block means; a picture limiting frame on said convex surface in substantially the focal plane of said partially permeable mirror for reflection thereby at substantially infinity; a substantially rectangular slot formed in a lateral surface of said front optical element outwardly of said partially light permeable interface and extending oblique to the optical axis of the viewfinder and in the path of light rays entering the viewfinder from the indicating means or the like; a mirror cemented in said slot and facing toward the indicating means or the like and toward said rear optical element; said mirror and said slot having sufficient clearance therebetween for the introduction of cement to cement said mirror to adjacent surfaces of said slot; said mirror reflecting said light rays to the eye end of the viewfinder; and a collimator lens mounted on said lateral surface of said front optical element in the path of said light rays in advance of said mirror and adapted to focus the image of the indicating means or the like into such field of view; said collimator lens being united to said lateral surface of said front optical element at a cementing interface formed by a pair of concentrically curved surfaces whereby, during uniting of the collimator lens to said front optical element, said collimator lens may be adjusted angularly about the center of curvature of said interface to compensate for any misalignment of said mirror resulting from the cementing thereof in said slot and to assure directing of said light rays into such field of view.

2. A block type Albada viewfinder, as claimed in claim 1, wherein one of said concentrically curved surfaces comprises a cylindrically concave groove formed in said lateral surface of said front optical element.

3. A block type Albada viewfinder, as claimed in claim 2, in which said cylindrically concave groove has a length exceeding that of the mating cylindrical cementing surface of said collimator lens; whereby said collimator lens may be adjusted further in a direction parallel to the axis of its cylindrical cementing surface.

4. A block type Albada viewfinder, as claimed in claim 1, including a carrier lens having an inner surface cemented to said lateral surface of said front optical element, the outer surface of said carrier lens constituting one of said pair of concentrically curved surfaces, the other concentrically curved surface being the inner surface of said collimator lens.

References Cited in the file of this patent

UNITED STATES PATENTS

| | | |
|---|---|---|
| 1,735,108 | Cox | Nov. 12, 1929 |
| 2,994,257 | Papke | Aug. 1, 1961 |

FOREIGN PATENTS

| | | |
|---|---|---|
| 258,865 | Switzerland | June 1, 1949 |